United States Patent

Beg et al.

[11] Patent Number: 5,181,155
[45] Date of Patent: Jan. 19, 1993

[54] OVERCURRENT TRIP CIRCUIT

[76] Inventors: Mirza A. Beg, 2300 Kimberly Dr., #24, Lima, Ohio 45805; David A. Fox, 3810 Emma Pkwy., Lima, Ohio 45806

[21] Appl. No.: 574,980
[22] Filed: Aug. 30, 1990
[51] Int. Cl.[5] .................. H02H 3/00; H02H 7/00; H02H 9/02
[52] U.S. Cl. ........................ 361/94; 361/87
[58] Field of Search ............. 361/94, 87, 95, 96, 361/31, 110

[56] References Cited

U.S. PATENT DOCUMENTS

| | | | |
|---|---|---|---|
| 3,604,983 | 9/1971 | Levin | 317/38 |
| 3,697,813 | 10/1972 | Fox . | |
| 3,697,860 | 10/1972 | Baker | 323/9 |
| 3,879,652 | 4/1975 | Billings | 323/225 C |
| 3,914,667 | 10/1975 | Waldron | 361/94 |
| 3,925,709 | 12/1975 | Mitchell et al. . | |
| 4,160,282 | 7/1979 | Dolinar et al. | 361/31 |
| 4,245,184 | 1/1981 | Billings et al. | 323/235 |
| 4,346,424 | 8/1982 | Hansen | 361/94 |
| 4,354,216 | 10/1982 | Volta | 361/92 |
| 4,363,064 | 12/1982 | Billings et al. | 361/57 |
| 4,404,473 | 9/1983 | Fox | 307/125 |
| 4,404,612 | 9/1983 | Hughes et al. | 361/31 |
| 4,605,982 | 8/1986 | Harner et al. | 361/94 |
| 4,707,761 | 11/1987 | Podobinski | 361/93 |
| 4,724,374 | 2/1988 | Beg | 323/272 |
| 4,825,330 | 4/1989 | Walchle | 361/95 |
| 4,833,563 | 5/1989 | Russell | 361/92 |
| 4,862,312 | 8/1989 | Ishii | 361/96 |

Primary Examiner—R. Skudy
Assistant Examiner—Ed To
Attorney, Agent, or Firm—Michael S. Yatsko

[57] ABSTRACT

An overcurrent trip circuit monitors the rate of rise of the current and the magnitude of the current in a power conductor and opens a circuit containing the power conductor when either the rate of rise of the current exceeds a first preselected limit value or the magnitude of the current exceeds a second preselected limit value. The inherent inductance in a metering shunt is used to produce a voltage signal that contains a component which is representative of the rate of change of current in a power conductor. This voltage signal is compared to a first reference signal to produce a trip signal when the voltage exceeds the first reference signal. In addition, the voltage signal is processed and the processed voltage signal is compared to a second reference signal to produce a second trip signal when the magnitude of the processed voltage signal exceeds the magnitude of the second reference signal. The power circuit is then opened in response to either of the first or second trip signals.

7 Claims, 2 Drawing Sheets

OVERCURRENT TRIP CIRCUIT

BACKGROUND OF THE INVENTION

This invention relates to switch control circuits and, more particularly, to overcurrent trip circuits used to control a power switch.

Electrical power systems, such as single or multiple phase AC or DC voltage types are required to be operative over a range of conditions limited by the current handling capacity of the wiring and loads. Due to cost and size considerations, it is frequently desirable to minimize the power handling capability of the system. However, for safety reasons, it is required to provide devices for the system to determine when current levels approach an overload condition, i.e., the point at which wiring and/or components may be damaged. As an example, in aircraft electrical power systems, the need for minimum size and weight, accompanied by high reliability and safety, is particularly acute. Conventional methods of overcurrent protection typically sense the instantaneous current and open the circuit if the current exceeds a trip threshold. In general, the time required by the switch to open the circuit after detection of the overcurrent may allow the current to reach damaging levels. This is particularly true in the case of resonant power supply currents which are designed to operate with high current pulses and a lowe inductance source.

When a load is powered by a low impedance source, a power control switch is used not only to control the power to the load but also to protect the system from abnormal loadings and short circuits. If a short circuit occurs at the load, the current immediately rises. The rate of rise is dependent on the source voltage and line impedance. Once the current reaches a preselected over-current trip point, a control circuit initiates a signal which opens the switch. Since the detector circuit and switch take a finite time to operate, the current continues to rise above the trip point. For example, in a 270 volt DC system with a line impedance of one microhenry and a switch opening time of 1 microsecond, the actual current will reach 270 amps above the trip threshold level. It is therefore desirable to devise a control system which opens the circuit before the current is permitted to reach damaging levels.

SUMMARY OF THE INVENTION

Circuits constructed in accordance with this invention monitor the current and the rate of rise of the current in a power conductor and open the power conductor circuit when either the rate of rise of the current exceeds a first limit value or the magnitude of the current exceeds a second limit value.

This is accomplished by producing a status signal representative of the current and rate of rise of current in the power conductor and comparing the status signal to a first reference signal for producing a first trip signal when the magnitude of the status signal exceeds the magnitude of the first reference signal. In addition, the status signal is processed and the processed status signal is compared to a second reference signal to produce a second trip signal when the magnitude of the processed status signal exceeds the magnitude of the second reference signal. The power conductor circuit is then opened in response to either the first or second trip signals.

The processing of the status signal may be accomplished by averaging the signal by means of a low pass filter or integrator. Alternatively, the second trip signal may be developed by filtering the status signal and using the filtered status signal as an input to one of many well known functional protective circuits with $I^2t$, $I \cdot t$, or peak trip characteristics.

This invention encompasses both overcurrent trip circuits and the methods used by those circuits to produce trip signals. By sensing the rate of rise of current in the power conductor and producing a trip signal in response to that rate of rise of current, a fast acting trip circuit is provided which can be used to limit the current in the power conductor so that it does not reach damaging levels.

BRIEF DESCRIPTION OF THE DRAWINGS

This invention will be more readily understood by reference to the following drawings wherein.

DESCRIPTION OF THE PREFERRED EMBODIMENT

Figure 1:
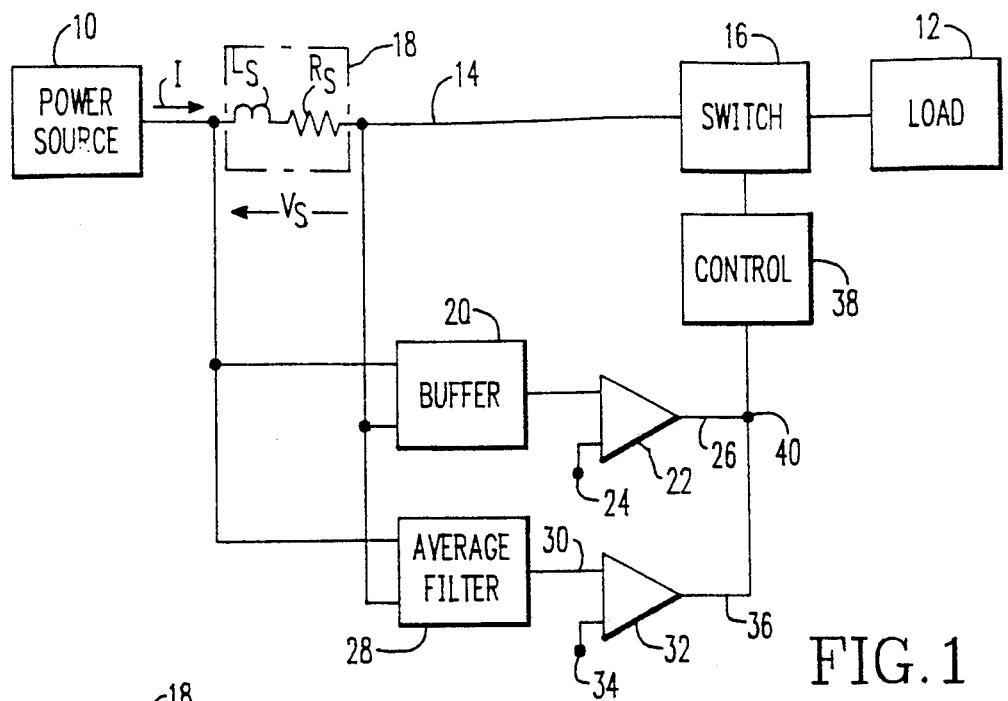
FIG. 1 is a block diagram of a power system having a switch controlled by an overcurrent trip circuit constructed in accordance with the present invention.

Referring to the drawings, FIG. 1 is a block diagram of a power system containing a switch with an overcurrent trip circuit constructed in accordance with this invention. A power source 10 which may be an AC or DC source, is connected to a load 12 by way of a power conductor 14 and a switch 16. A shunt 18 having resistance $R_s$ and inductance $L_s$ is connected in series with the power conductor 14 to provide a status signal representative of the current in the power conductor in the form of a voltage signal $V_s$. A buffer circuit 20 receives the status signal and transmits it to a first comparator 22 which compares the status signal with a first reference signal supplied on terminal 24. A trip signal is produced on line 26 when the magnitude of the status signal exceeds the magnitude of the first reference signal. This trip signal is predominately responsive to the rate of change of current in conductor 14.

To provide a slow trip capability, the status signal is processed and the resulting processed status signal is used to produce a second trip signal. In this embodiment, averaging filter 28 receives the status signal and produces an averaged status signal on line 30. This averaged status signal is compared by a second comparator 32 with a second reference signal supplied on terminal 34. A trip signal is produced on line 36 when the average current in conductor 14 exceeds the limit established by the second reference signal. A control circuit 38 constructed in accordance with known techniques controls the operation of the switch 16 in response to either of the trip signals. Alternatively, the slow trip function can be accomplished by processing the status signal in accordance with other known techniques to provide a second trip signal responsive to $I^2t$, $I \cdot t$, or peak current.

It should be apparent that the voltage $V_s$ developed across the shunt is a function of both the instantaneous current as well as the rate of rise of current such that:

$$V_s = R_s I + L_s (dI/dt)$$

The voltage developed across the shunt is used to protect the system from average overcurrent as well as from high rates of change of current. For the average current sensing, the voltage across the shunt is integrated using a relatively long time constant and compared with the average trip reference signal supplied on terminal 34. For the rate of change trip function, the shunt voltage is buffered and compared with a rate of rise reference voltage supplied on terminal 24.

Figure 2:
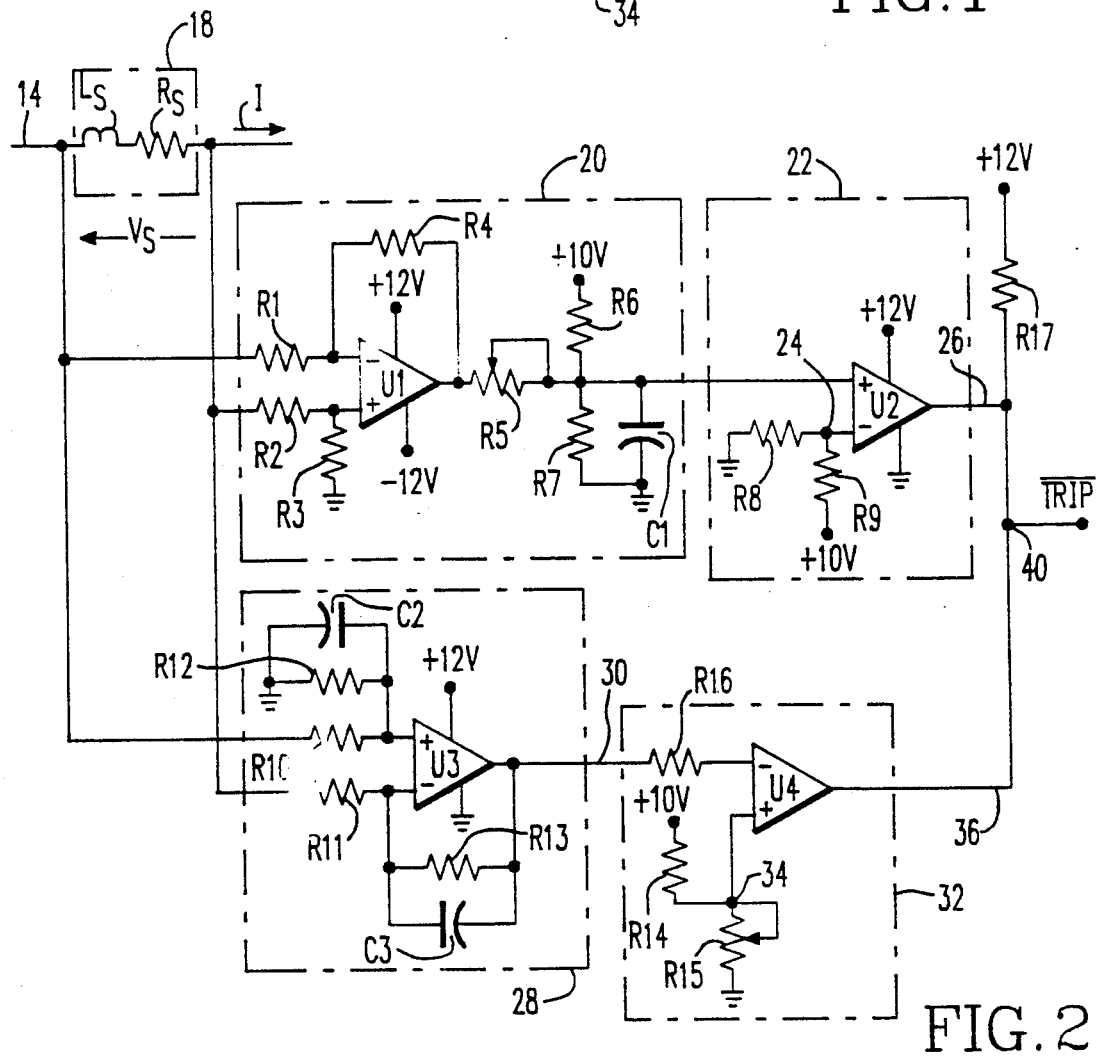
FIG. 2 is a schematic diagram of the over-current trip circuit portion of the system of FIG. 1.

FIG. 2 is a schematic diagram of a trip circuit portion of the system of FIG. 1. Buffer circuit 20 is shown to include resistors R1, R2, R3, R4, R5, R6 and R7; capacitor C1; and operational amplifier U1. Amplifier U1 inverts the polarity of the status signal. The first comparator 22 includes resistors R8 and R9; and operational amplifier U2. The first reference voltage is established at junction point 24 in the voltage divider formed by resistors R8 and R9. Averaging filter 28 is shown to include resistors R10, R11, R12 and R13; capacitors C2 and C3; and operational amplifier U3. These components combine to produce an averaged shunt voltage on line 30 which is received by the second comparator 32 comprising resistors R14, R15 and R16 and operational amplifier U4. The second reference voltage is formed at point 34 in the voltage divider formed by resistors R14 and R15. A dropping resistor R17 ensures the proper voltage level for the trip signals on lines 26 and 36. Operational amplifiers U2 and U4 are open collector types which are directly connected together to form a "wired OR" function. A negative going trip signal is produced at point 40 when either comparator reference level is exceeded.

Figure 3:
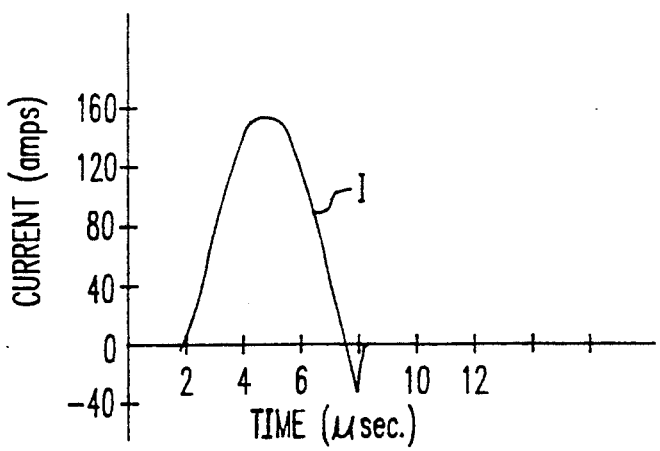
FIGS. 3, 4, and 5 are waveforms which illustrate the operation of the circuit of FIG. 2.
Figure 4:
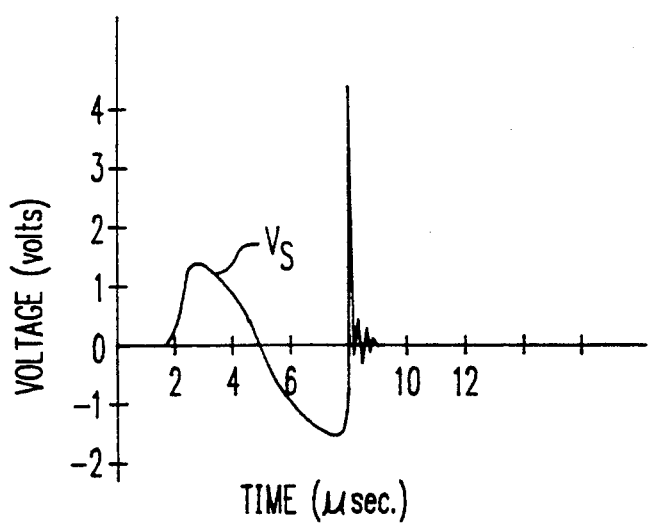
Figure 5:
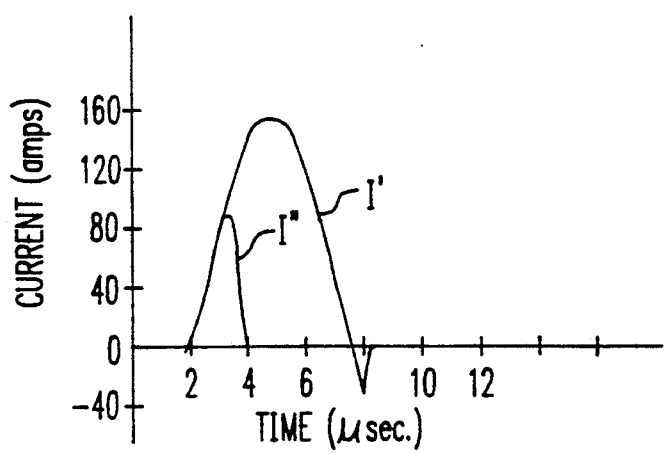

FIGS. 3, 4, and 5 are waveforms which illustrate the operation of the circuit of FIG. 2. FIG. 3 shows a typical resonant power supply input current pulse, in this case about 6 microseconds wide and about 140 amps high. FIG. 4 shows the voltage developed across a 50 millivolt, 100 amp shunt caused by this input current. This shunt has an equivalent resistance of 0.5 mΩ and an inductance of 18 nH. Note that the input current is sinusoidal and the shunt voltage is a cosine, the derivative of the current waveform. The shunt voltage is seen to reach a peak of about 1.4 volts, much higher than the 70 millivolt value found by multiplying the shunt sensitivity by the peak current value.

FIG. 5 illustrates the performance of the overcurrent trip circuit of this invention. The sinusoidal pulse of load current I', in this case about 6 microseconds wide and 140 amps high, represents the current that would flow in the power conductor if it were not prematurely interrupted. The shortened pulse of current I" shows the operation of the trip circuit sensing of the fast rate of change of current such that interruption of the current occurs within about 2 microseconds. It can therefore be seen that the power switch response is shown to be capable of anticipating impending high fault currents and interrupting the circuits before the fault current reaches damaging levels.

Although it might be thought that a high quality, non-inductive shunt would be required to sense a fast rising current, the present invention utilizes the inherent inductance of a typical shunt to sense both the average current, as well as the rate of change of current in a power conductor. The sensed rate of change of current serves as a measure of impending high current and is used to turn off the power switch before the current has time to reach damaging levels.

Although the present invention has been described in terms of what is at present, its preferred embodiment, it will be apparent to those skilled in the art that various changes may be made without departing from the scope of the invention. The appended claims are intended to cover such changes.

What is claimed is:

1. An overcurrent trip circuit comprising:
    means for producing a status signal representative of current and rate of rise of the current in a power conductor, said means for producing a status signal including a shunt sensor inline with said power conductor, said shunt sensor having a resistive component for use in producing that portion of said status signal that is representative of said current in said power conductor and further having an inductive component for use in producing that portion of said status signal that is representative of said rate of rise of the current in said power conductor;
    means for comparing said status signal to a first reference signal representative of a first preselected limit value for the rate of rise of current in said power conductor, and for producing a first trip signal when the magnitude of said status signal exceeds the magnitude of said first reference signal;
    means for processing said status signal to produce a processed status signal, said processed status signal representative of an average value of the current through said power conductor;
    means for comparing said processed status signal to a second reference signal and for producing a second trip signal when the magnitude of said processed status signal exceeds the magnitude of said second reference signal; and
    means for opening a circuit in response to said first or second trip signals.

2. An overcurrent trip circuit as recited in claim 1, wherein said means for comparing said status signal to a first reference signal comprises:
    a buffer circuit for receiving said status signal; and
    a comparator for comparing an output of said buffer circuit with said first reference signal.

3. An overcurrent trip circuit as recited in claim 1, wherein said means for processing said status signal comprises an averaging filter connected to receive said status signal and having said processed status signal as an output of said averaging filter.

4. An overcurrent trip circuit as recited in claim 3, wherein said means for comparing said processed status signal to a second reference signal comprises a comparator having a first input connected to said output of said averaging filter, a second input connected to receive said second reference signal, and an output signal as said second trip signal.

5. An overcurrent trip circuit comprising:
    means for monitoring average current and rate of rise of current in a power conductor, said means for monitoring including a shunt sensor in-line with said power conductor, said shunt sensor having a resistive component for use in producing a first signal that is representative of said average current in said power conductor, said shunt sensor further having an inductive component for use in producing a second signal that is representative of said rate of rise of the current in said power conductor; and
    means for opening a circuit containing said power conductor when either the rate of rise of the current exceeds a first preselected limit value or the magnitude of the average current exceeds a second preselected limit value.

6. A method for opening a circuit in the event of an overcurrent condition, said method comprising the steps of:
producing a status signal representative of current and rate of rise of the current in a power conductor by connecting a shunt sensor in-line with said power conductor, said shunt sensor having a resistive component for use in producing the portion of said status signal that is representative of said current in said power conductor and further having an inductive component for use in producing that portion of said status signal that is representative of said rate of rise of the current in said power conductor;
comparing said status signal to a first reference signal representative of a first preselected limit value for the rate of rise of current in said power conductor, and for producing a first trip signal when the magnitude of said status signal exceeds the magnitude of said first reference signal;
processing said status signal to produce a processed status signal, said processed status signal representative of an average value of the current through said power conductor;
comparing said processed status signal to a second reference signal and producing a second trip signal when the magnitude of said processed status signal exceeds the magnitude of said second reference signal; and
opening a circuit in response to said first or second 7. A method for opening a circuit in the event of an overcurrent condition, said method comprising the steps of:
monitoring average current and rate of rise of in a power conductor by connecting a shunt sensor in-line with said power conductor, said shunt sensor having a resistive component for use in producing a first signal that is representative of said average current in said power conductor and further having an inductive component for use in producing a second signal that is representative of said rate of rise of the current in said power conductor; and
opening a circuit containing said power conductor when either the rate of rise of the current exceeds a first preselected limit value or the magnitude of the average current exceeds a second preselected limit value.

* * * * *